(12) United States Patent
Pishevar (10) Patent No.: US 11,308,678 B1
(45) Date of Patent: *Apr. 19, 2022

(54) SYSTEMS AND METHODS FOR GENERATING CARTOON IMAGES FROM IMAGES

(71) Applicant: Umojify, Inc., Potomac, MD (US)

(72) Inventor: Afshin Pishevar, Potomac, MD (US)

(73) Assignee: UMOJIFY, INC., Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,265

(22) Filed: Jul. 9, 2020

Related U.S. Application Data (63) Continuation of application No. 16/159,267, filed on Oct. 12, 2018, now Pat. No. 10,748,322.

(60) Provisional application No. 62/572,143, filed on Oct. 13, 2017.

(51) Int. Cl.
| | |
|---|---|
| *G06T 13/80* | (2011.01) |
| *G06F 3/04817* | (2022.01) |
| *G06T 11/60* | (2006.01) |
| *G06K 9/00* | (2022.01) |

(52) U.S. Cl.
CPC .......... *G06T 13/80* (2013.01); *G06F 3/04817* (2013.01); *G06K 9/00281* (2013.01); *G06T 11/60* (2013.01)

(58) Field of Classification Search
CPC ..... G06T 13/80; G06T 11/60; G06K 9/00281; G06F 3/04817
See application file for complete search history.

(56) References Cited

U.S. PATENT DOCUMENTS

| | | | |
|---|---|---|---|
| 8,437,514 B2 | 5/2013 | Wen et al. | |
| 9,082,235 B2 | 7/2015 | Lau et al. | |
| 9,330,483 B2 | 5/2016 | Du et al. | |
| 2002/0102010 A1* | 8/2002 | Liu | .................... G06K 9/00248 |
| | | | 382/107 |
| 2004/0034611 A1 | 2/2004 | Kee et al. | |
| 2005/0212821 A1* | 9/2005 | Xu | .......................... G06T 11/00 |
| | | | 345/647 |

OTHER PUBLICATIONS

Dove, J., YourMoji keyboard for iOS lets you create emoji composites with your own photos, Jul. 2015, https://thenextweb.com/apps/2015/07/30/yourmoji-keyboard-for-ios-lets-you-create-emoji-composites-with-your-own-photos/, pp. 1-7. (Year: 2015).*

(Continued)

*Primary Examiner* — Said Broome
(74) *Attorney, Agent, or Firm* — Fox Rothschild LLP (57) ABSTRACT

Systems and methods for generating cartoon images or emojis of an individual from a photograph of the individual is described. The systems and methods involve transmitting a picture of the individual, such as one taken with a mobile device, to a server that generates a set of emojis showing different emotions of the individual from the picture. The emojis are then transmitted to the mobile device and are available for use by the user in messaging applications, emails, or other electronic communications. The emojis can be added to the default keyboard of the mobile device or be generated in a separate emoji keyboard and be available for selection by the user.

20 Claims, 5 Drawing Sheets

(56) References Cited

OTHER PUBLICATIONS

Zhang, Y., Dong, W., Deussen, O., Huang, F., Li, K., Hu, B., Data-Driven Face Cartoon Stylization, Dec. 2014, SIGGRAPH 2014, pp. 1-4. (Year: 2014).*

Yong Zhang et al., "Data-Driven Face Cartoon Stylization", SIGGRAPH Asia Dec. 2014, Shenzhen, China, 4 pages.

Meng Meng et al., "Artistic Paper-Cut of Human Portraits", ACM 2010, 4 pages.

Saman Sepehri Nejad et al., "Component-Based Cartoon Face Generation", MDPI, Electronics 2016, 14 pages.

* cited by examiner

SYSTEMS AND METHODS FOR GENERATING CARTOON IMAGES FROM IMAGES

CROSS-REFERENCE TO RELATED APPLICATIONS

This application is a continuation of U.S. application Ser. No. 16/159,267, filed Oct. 12, 2018, which claims the benefit of U.S. Provisional Application 62/572,143, filed on Oct. 13, 2017, the entirety of each application are expressly incorporated herein by reference,

BACKGROUND OF THE INVENTION

Emojis are popular for expressing emotions in messaging applications. Currently, there is no known technology that can effectively and quickly produce realistic and artistic emojis of an individual expressing different emotions by using a photograph of the individual (e.g., selfie).

BRIEF DESCRIPTION OF THE DRAWINGS

For the present invention to be clearly understood and readily practiced, the present invention will be described in conjunction with the following figures, wherein.

DETAIL DESCRIPTION OF THE INVENTION

The present invention is generally related to systems and methods for generating cartoon image of an individual (primarily the individual's head and face) from a photograph (photographic image generated or captured by a camera) of the individual and generating an emoji keyboard containing a set of cartoon images of the individual expressing different emotions, perspectives, or states. In accordance with principles of the present invention, a software application (an "app") configured to provide cartoon images from photographs is installed on a mobile device. For example, upon taking a picture of an individual through a camera of the mobile device, the application transmits the picture from the mobile device (typically a mobile telephone) to a server that generates a set of emojis showing different emotions, perspectives, or states of the individual's head and face from the received picture. The emojis are then transmitted to the mobile device and are available for use by the user in messaging applications, emails, or other electronic communications. The emojis can be added to the default keyboard of the mobile device or be generated in a separate emoji keyboard and be available for selection by the user. The addition of the emoji keyboard to the device may involve different steps depending on the device.

Figure 1:
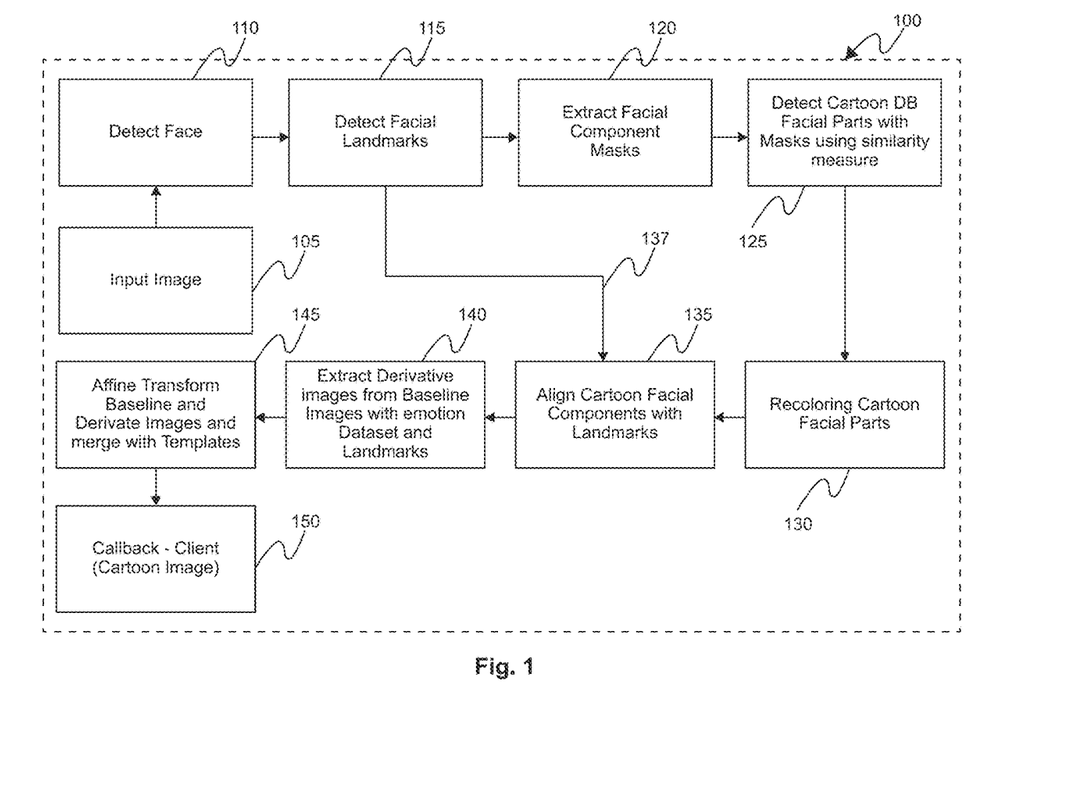
FIG. 1 depicts an illustrative method for generating cartoon images from photographs in accordance with some embodiments of the present invention.

FIG. 1 depicts an illustrative method 100 for generating cartoon images from photographs (cartoon version of the individual's headshot) in more detail. Method 100 begins with inputting an image (step 105). The image may be captured from the camera of the mobile device on which the mobile software application (or mobile app) is installed. The image may also be transmitted to the mobile device from another device (e.g., another mobile device, a camera separate from the mobile device, or a scanner) or through other means. The image may be a picture, a head shot of a user of the mobile device or another individual. The image is transmitted from the mobile device to a cartoon image generation server that is configured to produce cartoon images and emojis. On the server, method 100 detects whether a person's face exists in the received image of the individual (step 110). If a person's face exists, method 100 detects landmarks of the face (step 115). The image is processed in conjunction with a set of predefined landmarks to detect and locate the position of those landmarks on the image. The position information may be used later in assembling the closest cartoon landmarks (described below). The mobile app may include a process for having the face positioned and sized at an appropriate dimension in the image. For example, there may be reference points that are displayed to be used for alignment or there can be a software process that automatically scales and positions the image (e.g., when a face is automatically detected in the image). The position of face (or landmarks) is analyzed to determine if the face is at an angle and if so it is processed to remove the angle and make it vertical (straight vertical, not tilt). Landmarks may include one or more of a person's head, hair, chin, beard, eyebrow, eye, nose, mouth, and ears. The detecting step 115 includes placing one or more masks over the received image. A mask is a window that represents a portion of the received image with a black and white pattern. The black and white pattern can vary depending on the complexity of the corresponding portion. A numeric value can be obtained from each mask based on the black and white pattern. The detecting step 115 can calculate a sum of the brightness of all the pixels in the white part of the window, calculate a sum of the brightness of all the pixels in the black part of the window, and calculate a difference between the two sums. The detecting step 115 then compares the difference of one or more windows with a threshold value to determine whether a face or a facial landmark exists in the received image.

Upon detecting a facial landmark, method 100 extracts the corresponding window or the difference value of the corresponding window (step 120) and uses it to search the closest cartoon landmark which is also stored in a database in the form of image (step 125). In some embodiments, method 100 compares the facial landmark in the window with the corresponding cartoon landmarks stored in the database (e.g., compares the nose in the window with a plurality of cartoon nose images) and determines the closest cartoon landmark that resembles the landmark (e.g., the closest cartoon nose image). In one embodiment, this comparison step can be performed by comparing pixel shading or coloring (e.g., pixel by pixel, by regions, etc.). The server may include a previously developed and saved database of different cartoon landmarks (e.g., eyes, nose, hair, etc.). The database may be located in the same server or on a different server that is accessible by the server.

Figure 2:
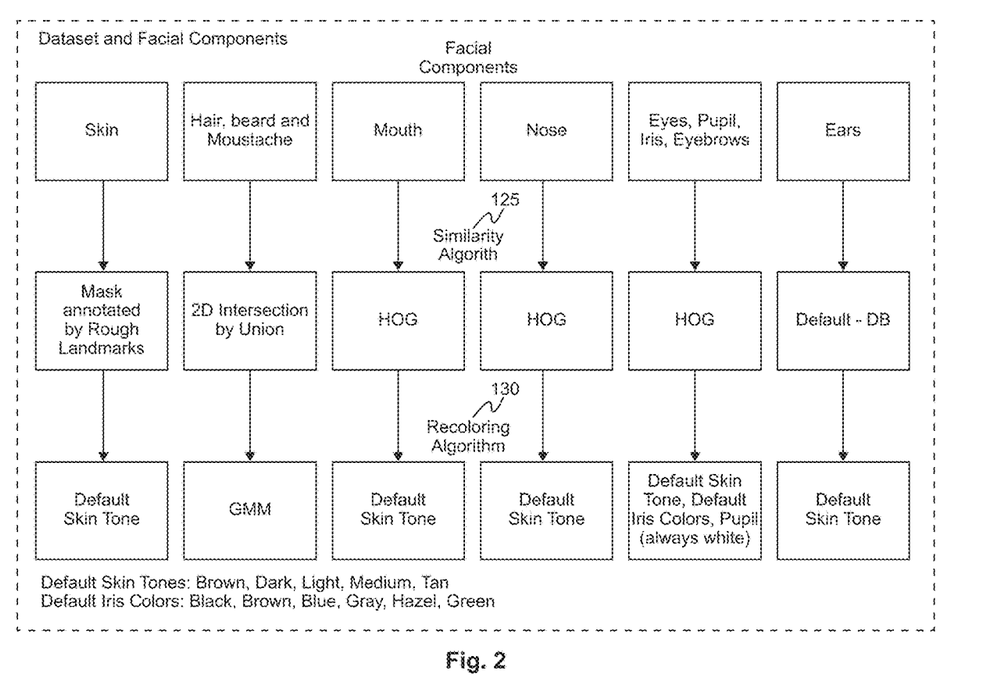
FIG. 2 depicts illustrative similarity and recoloring algorithms for facial landmarks in accordance with some embodiments of the present invention.

The searching step 125 may employ a similarity algorithm to perform the search. The similarity algorithm may be Histograms of Oriented Gradients (HOG). The Intersection of Union (IoU) algorithm compares the masks of extracted facial component of original image and cartoon image for overlap where a high score indicates a good shape similarity. The facial landmarks related to cheek, chin and jaw are connected by drawing a curved line using splines to represent the skin (lower part of the face—no similarity measure used here). By considering the difference in extracted features (IoU or HOG), the similarity algorithm determines which cartoon landmark in the database is the closest one in resembling the facial landmark in the window. Subsequent to finding the closest cartoon landmark, method 100 performs a recoloring algorithm (step 130) to the closest cartoon landmark. The recoloring algorithm may be based on a Gaussian Mixture Model (GMM) or apply a default color tone. The type of similarity algorithm and the type of recoloring algorithm may vary based on the type of landmark, such as varying in manners shown in FIG. 2. The similarity algorithm (HOG) and the recoloring algorithm (default skin tone) for the mouth are different from the similarity algorithm (2D intersection by union) and the recoloring algorithm (GMM) for hair, beard, and moustache. Other facial landmarks and their respective illustrative similarity and recoloring algorithms are also shown in FIG. 2.

After finding the closest cartoon landmarks (step 125) and recoloring the closest cartoon landmarks (step 130), the recolored closest cartoon landmarks are assembled to form a first cartoon image (baseline image) of the person's face (step 135). Method 100 can include steps in which the server (configured by software in this instance in general) determines reference points on the individual face or head, within the photographic image (the image obtained in step 105) and determines positional interrelationship between reference points, landmarks, or other types of points. For example, a mapping of how the landmarks fit together is generated and is used in step 135 to create the cartoon version of the person using the matching cartoon landmarks (from the database).

For some facial landmarks, steps 120, 125, and 130 are unnecessary and method 100 may select default cartoon landmarks and continue to step 135 and the subsequent steps (via link 137). For example, as shown FIG. 2, default cartoon ears can be chosen for detected ears, instead of finding the closest cartoon ear.

The groups of landmark positions are specified for different facial elements (e.g., nose, eye, etc.) and their positions are compared to the cartoon database for that facial element to locate closest/best matches. The system then performs shading by matching skin tone and can further apply graphic processing to the select cartoon facial element to make it have a closer match to the located landmarks for that facial element for that person.

If desired, method 100 then adjusts the first cartoon image so that it is compatible with different messaging applications (e.g., changes its resolution, image size, etc.). In a preferred embodiment, the app and server are configured to perform the method without the involvement of the user to select a graphic landscape element or cartoon landmark image (cartoon nose, cartoon hair, cartoon skin color, etc.) and without the software providing the user with ability to modify the resulting image in a graphical user interface. To further clarify, some prior art systems, require a process in which the user creates an image of his head or person using graphical tools where he or she can select landmarks and perform adjustments to create a cartoon image of themselves. Embodiments of the present invention are preferably implemented without including any such options. However, in some embodiments, the opportunity to add or modify landscape features or the cartoon image can be provided to the user via a graphical user interface if desired.

A plurality of templates or computer implemented (automated) algorithms configured to produce a plurality of cartoon images showing different emotions of a person are stored in the server, the cartoon landmark database, or in another location accessible by the server. There are other image variations that can be included such as perspective, head angle, or state but for brevity the discussion is focused on emotions. Based on the first cartoon image and the templates, method 100 can create additional cartoon images showing different emotions of the person in the first cartoon image. The derivative image extraction step 140 generates a set number of images by changing, warping, and/or replacing certain facial components in the generated cartoon image (baseline image). Each generated derivative image expresses an emotion, perspective, or state. The database storing the cartoon landmarks may further include other graphics that can be copied and pasted onto the baseline image to change the individual's emotion, perspective, or state. The graphics may include different sets of graphics with each set representing or being used for an emtion. For example, upon creating the baseline image, certain landmarks in the baseline image may be warped in a manner to generate a first derivate image that express a first emotion, perspective, or state (warp only). To generate a second derivative image that express a second emotion, perspective, or state, some of the landmarks (e.g., mouth) in the baseline image may be warped in a certain manner and some of the landmarks (e.g., eyes) in the baseline image may be replaced by other graphics in the database (warp and replacement). The replacement procedure may be performed by removing the landmarks and replacing the removed landmarks with the desired graphics, or by copying and pasting the graphics onto the landmarks to be replaced. To generate a third derivate image that express a third emotion, perspective, or state, certain landmarks in the baseline image may be replaced by the desired graphics (replacement only).

The affine transformation step 145 translates, rotates and scales the image (or each image) to fit in a user defined template and may use blending algorithms to improve the overall graphics in the final image. The cartoon landmarks employed by the first cartoon image are imported into the templates, and the templates include rules that specify the locations of, the relationship between, and the adjustments to be made to the cartoon landmarks. There can also be algorithms (as mentioned) that received the cartoon image generated by the sever from the photographic image (and related information such reference points and interrelationships) and automatically converts the face in the generated cartoon image (the baseline image or first cartoon image) into a multiple new cartoon images each containing the individual's cartoon face or head expressing a different emotion. There may be a set of different templates and algorithms that are each stored and configured to correspond to a particular state of emotion (e.g., a sad algorithm that corresponds to a function of converting the baseline image to express sadness).

"Artistic Paper-Cut of Human Portraits" to Meng et al. (Meng), which was published in the Proceedings of ACM Multimedia 2010 International Conference held from Oct. 25-29, 2010 in Firenze, Italy, is a reference directed to a method for producing an artistic paper-cut image from a human portrait. Meng discusses relevant concepts and illustrative computations in details, and is incorporated by reference in its entirety. Meng was published in the Proceedings of ACM Multimedia 2010 International Conference which was held from Other techniques known in the field may also be used. Such techniques may be used with input or variations described herein if desired.

The first cartoon image and additional cartoon images showing different emotions produced on the server are then transmitted to the mobile device (step 150). The cartoon images may be available in a digital keyboard or other digital input mechanism of the mobile device. The user of the mobile device can select one or more of the cartoon images to be included in an electronic message to be sent to another party. There can be various configurations such as a periodic generation of new derivative cartoon images (referring to cartoon images of the individuals head and face that were automatically generated from the baseline image) and loading of the images on that corresponding user's device.

Figure 3:
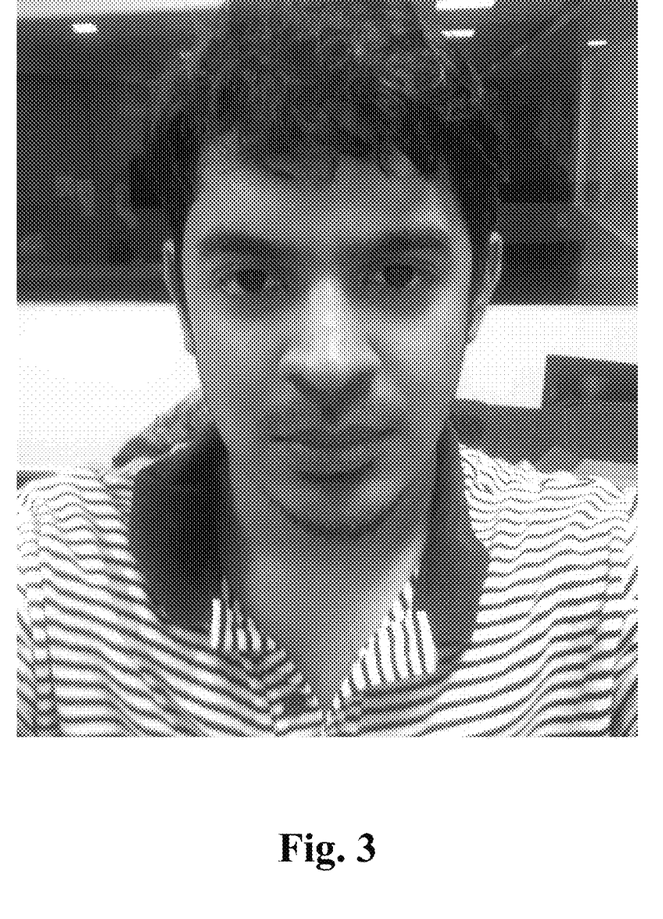
FIG. 3 depicts an illustrative photograph of an individual in accordance with some embodiments of the present invention.
Figure 4:
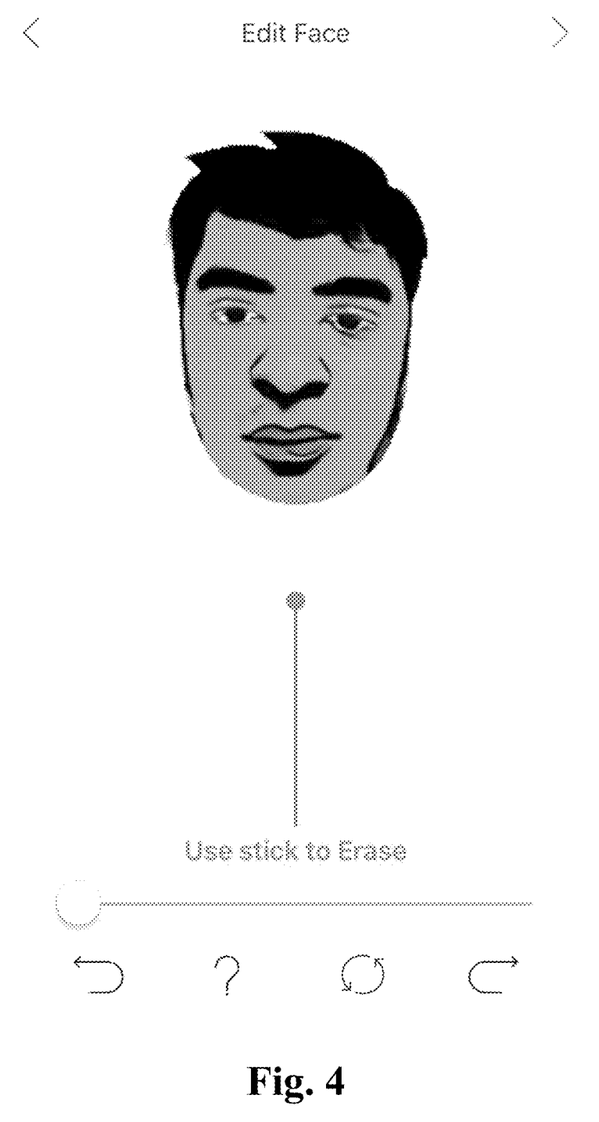
FIG. 4 depicts an illustrative baseline image in accordance with some embodiments of the present invention.
Figure 5:
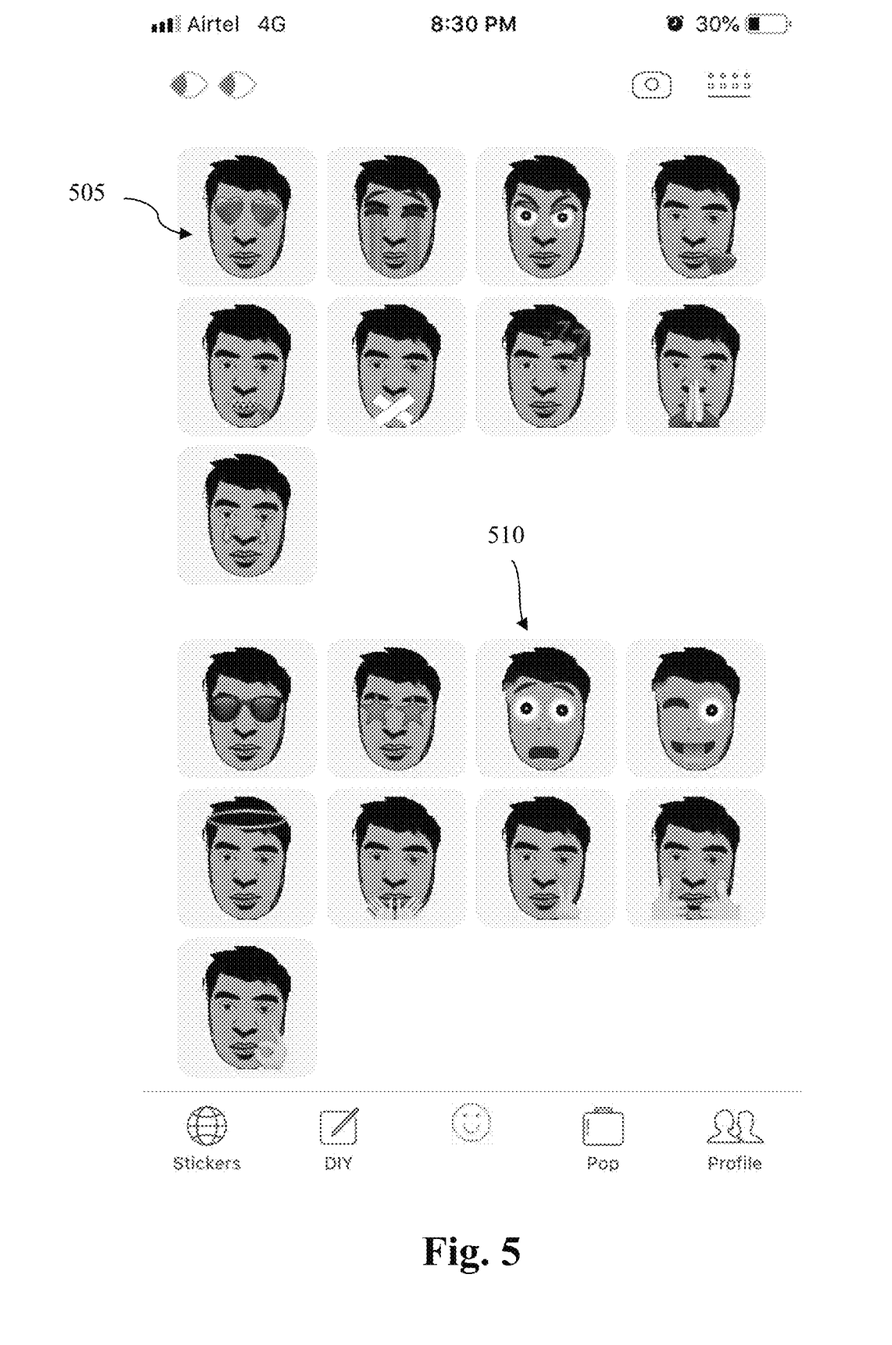
FIG. 5 depicts illustrative derivative cartoon images in accordance with some embodiments of the present invention.

FIG. 3 depicts an illustrative photograph (e.g., selfie) of an individual captured by his mobile device. FIG. 4 depicts an illustrative baseline image generated by the server or mobile device using the selfie. FIG. 5 depicts illustrative derivative cartoon images produced using the the baseline image. The derivative cartoon images include images of the individual expressing different emotions, perspectives, or states. The derivative cartoon images are obtained by warping, replacing, or warping and replacing certain landmarks in the baseline image. For example, derivative cartoon image 505 may be an image generated by replacing the eyes of the individual in the baseline image. The replacement procedure may be performed by copying the heart shaped eyes graphics from the database and pasting the graphics onto the eyes of the individual in the baseline image. Derivative cartoon image 510 may be an image generated by replacing the eyebrows, eyes, nose, and mouth of the individual in the baseline image. The replacement procedure may be performed by copying the eyebrows, eyes, nose, and mouth graphics from the database and pasting those graphics onto the respective position on the face in the baseline image. In some embodiments, certain landmarks, for example, the eyebrows and mouth, may be modified by warping the baseline image (or those landmarks in the baseline image) instead of inserting graphics from the database. The baseline image is an image showing the individual's emotion in the selfie, or a default emotion determined by the server or mobile device.

Embodiments of the present invention may also include a method for training a system to generate cartoon images from photographs. The method may be one that can train the system to generate cartoon images that resemble different emotions of the face of a person (e.g., head shot) in a real image. The system may be the cartoon image generation server discussed above. The method is configured to process real images for building a database containing cartoon landmark images and for learning to identify cartoon landmark images that are closest to the facial landmarks. The method is computer implemented method in that it automatically performs the mentioned operations to achieve the resulting output (function). It should be understood that training can involve a user providing asset of reference images to the system and adjusting the training operation based on output generated by the system and the reference image.

A process is implemented that takes the "real life" photograph from the mobile device and automatically produces an image (which may also be considered a graphic or a graphic image). In this embodiment, the process generates a "life-like" and artistic version of the individual's face and head as opposed to a caricature or a comic cartoon.

In some embodiments, the system in analyzing an image and generating a cartoon image performs an operation in which section of the image corresponding to landmarks are cropped, which can improve the related analysis.

In some embodiments, the baseline cartoon image and the derivative cartoon images can be configured to represent certain information (e.g., a profile picture, an email address, an Internet link (e.g., URL), a telephone number) and/or to initiate functionalities of the mobile device associated with the represented information. The functionalities can be hardware-based (e.g., making a telephone phone call) and/or software-based (e.g., opening up an individual's Facebook or other app). For example, the baseline image can be configured to be an individual's telephone profile picture, a first derivative cartoon image can be configured to be the individual's e-mail address, a second derivative cartoon image can be configured to be a link to the individual's Facebook, and a third derivative cartoon image can be configured to be the individual's telephone number. For instance, upon selecting the first cartoon image, the mobile device can display email address of the individual and/or initiate an email app of the mobile device for the user to compose an email to that individual (automatically inserting the associated email address in the draft email in response). The individual may be the user of the mobile device, a person in the address or contact book, or other individual. The configuration may be controlled by the cartoon image generation sever or by the user via a graphical interface of the mobile device. In implementation, the cartoon or derivative image can be logically linked with the information or computer activity (e.g., email address, URL) and the image would be active in that the user can select the image to actuate the action (for example). The feature can be integrated into the mail application to be the signature or part of the signature of the user. In some embodiments, the baseline cartoon image or a derivative cartoon image can be processed (by the system/software) to be embedded with meta data that can enable the image to be used as a URL, web address, email address, telephone, or other communication link (e.g., a hot link). For example, this can be implemented as part of generating the baseline cartoon image or a derivative cartoon image (or as part of a subsequent of the system or software application). For example, an interactive option in a mobile application (or a server) can embed the meta data after an image is created and make the image and embedded meta data available as unit for a user to select and use in various applications such as a signature line in an email application (which when selected, in response, the software/device automatically opens a draft communication addressed to that individual by way of the embedded association with communication address such as email address or IM address).

In some embodiments, method 100 or cartoon facial component identification, re-coloring and global alignment (no training) methods may be performed by the mobile device without relying on a server and/or an external database. The software application installed on the mobile may include modules that operate similar to the cartoon image generation server and a database storing the cartoon landmark images.

In addition to mobile device, the above methods and software application can also be performed by and installed on other computing devices such as desktop computers, laptop computers, server, tablets, PDAs, and other devices.

The generation of a first cartoon image and derivative cartoon images can be implemented to be automated by configuring the computer(s) (e.g., desktop computers, laptop computers, servers, tablets, PDAs, mobile phones, or combinations thereof) using software that automatically performs the process. Manual intervention or manipulation using a graphics user interface can be incorporated into the system if desired.

If desired, in some embodiments, one or more derivative images are generated at the mobile device instantaneously when the user desires to use the keyboard generated on the mobile device at some other point. This way some of the processing can be distributed.

As understood from the disclosure, an algorithm that defines a conversion to a defined emotion can involve a set of graphics (or operators that generate a graphic) such as a heart graphic that is associated with a landmark or set of landmark positions (and associate facial feature) in the system (saved as data or software that specifies relationship), each defined emotion may have a different set of graphics (or operators) including associate location (landmark and/or facial element), the algorithm replaces or modifies a portion of the image using the information for that defined emotion (e.g., the stored graphic is pasted on the location for that associated facial element or landmark position(s), specified to the data for that image/individual, to replace that image element(s) (facial element in the image), and/or a warping graphic process can be applied based on the emotion to move the landmark positions (specific to that person/image) to a second state such as to warp the landmark to express smiling (moving and stretching landmarks up and curled), and the interrelationship between landmarks, landmark positions, or facial elements for that image (after applying steps) can be measured and determine whether adjustment should be made because they are beyond or under preset thresholds. Other aspects of algorithms or clarifications may be understood in context herein. These are for example a set of rules that are integrated into the system that are not previously implemented manually or otherwise that provide an improved derivative image such as with better graphic representation involving faster and more efficient processing operation.

If desired, the resulting image is produced and/or saved to be the same size as general emojis used in keyboard of mobile phones. These are typically about the same size as a letter on the keyboard (e.g., are about the same size as letters in keyboard such as when typing, it would be about the same as a letter in this sentence). With this technique, for example, one could then replace the basic smile emoji with a smile image graphic, under the process herein, that is about the same size as the existing smile emoji in the keyboard. The sent image would be able to surprise users with this twist. If desired, a gif of this new emoji would be transmitted to the recipient as part of the process.

It is also implicit and understood that the applications or systems illustratively described herein provide computer-implemented functionality that automatically performs a process or process steps unless the description explicitly describes user intervention or manual operation.

Different order of steps and removal or addition of steps are understood to be contemplated.

The approach and teaching discussed herein includes many technical advantages that speed up the processing and/or provides better output.

As is generally understood, terms such as "a" or "an" can include "one or more."

Counterpart system and computer-readable medium embodiments would be understood from the above disclosure. Computer readable instructions for implementing the embodiments can be stored in non-volatile (non-transient memory). It is understood that a computer includes volatile and non-volatile memory. Also, broader, narrower, or different combinations of the described features are contemplated, such that, for example features can be removed or added in a broadening or narrowing way.

It should be understood that the above-described examples are merely illustrative of some of the many specific examples that represent the principles described herein. Clearly, those skilled in the art can readily devise numerous other arrangements without departing from the scope as defined by the following claims.

The invention claimed is:

1. A personal emoji keyboard generating system comprising:
a computer configured with software instructions that configures the computer to automatically:
receive a photographic image of a head shot of a person;
process the photographic image to identify landmarks and determine interrelationship between reference points on a face of the person in the heat shot image;
store a database of cartoon landmarks;
compare the landmarks of the photographic image to the database of cartoon landmarks and identify cartoon landmarks in the database that match or are the closest match;
assemble a cartoon head shot image of the person by assembling the matching cartoon landmarks based on the determined interrelationships;
store a plurality of algorithms that each corresponds to a defined emotion wherein the algorithm is configured to convert the cartoon head shot to express the defined emotion;
convert the cartoon head shot using the algorithm, wherein the conversion results in producing a plurality of new cartoon images that each contains cartoon head shot that expresses a corresponding emotion defined by the corresponding algorithm; and
transmit a digital keyboard containing a plurality of the new cartoon images expressing different emotions to a mobile device of the person.

2. The system according to claim 1, wherein the comparing step includes executing a similarity algorithm.

3. The system according to claim 1, wherein the similarity algorithm is Histograms of Oriented Gradients.

4. The system according to claim 1, wherein the similarity algorithm is Intersection of Union algorithm.

5. The system according to claim 1, wherein the computer is further configured with software instructions that configures the computer to automatically:
perform a recoloring algorithm to the matching or closest matching cartoon landmarks.

6. The system according to claim 1, wherein the recoloring algorithm is based on a Gaussian Mixture Model.

7. The system according to claim 2, wherein the comparing step executes a first similarity algorithm for a subset of landmarks and a second similarity algorithm for another subset of landmarks, wherein the first and second similarity algorithms are different.

8. The system according to claim 1, wherein the computer is further configured with software instructions that configures the computer to automatically:
select default cartoon landmarks for identified landmarks.

9. The system according to claim 1, wherein the image processing step includes processing the photographic image in conjunction with a set of predefined landmarks to locate positions of the landmarks on the photographic image.

10. The system according claim 1, wherein the new cartoon images expressing different emotions are capable of being configured to store information and initiate a functionality of the mobile device.

11. The system according claim 10, wherein one of the new cartoon images is capable of storing an email address and initiate an email app on the mobile device upon selection.

12. A method for generating a personal emoji keyboard comprising:
receiving, by a computer, a photographic image of a head shot of a person;
processing, by the computer, the photographic image to identify landmarks and determining, by the computer, interrelationship between reference points on a face of the person in the heat shot image;
storing, in the computer, a database of cartoon landmarks;
comparing, by the computer, the landmarks of the photographic image to the database of cartoon landmarks and identifying, by the computer, cartoon landmarks in the database that match or are the closest match;
assembling, by the computer, a cartoon head shot image of the person by assembling the matching cartoon landmarks based on the determined interrelationships;
storing, in the computer, a plurality of algorithms that each corresponds to a defined emotion wherein the algorithm is configured to convert the cartoon head shot to express the defined emotion;
converting, by the computer, the cartoon head shot using the algorithm, wherein the conversion results in producing a plurality of new cartoon images that each contains cartoon head shot that expresses a corresponding emotion defined by the corresponding algorithm; and
transmitting, by the computer, a digital keyboard containing a plurality of the new cartoon images expressing different emotions to a mobile device of the person.

13. The method according to claim 12, wherein the comparing step includes executing Histograms of Oriented Gradients or Intersection of Union algorithm.

14. The method according to claim 12, further comprising performing a recoloring algorithm to the matching or closest matching cartoon landmarks.

15. The method according to claim 12, wherein the image processing step includes processing the photographic image in conjunction with a set of predefined landmarks to locate positions of the landmarks on the photographic image.

16. The method according claim 12, further comprising configuring the new cartoon images to be capable of storing information and initiating a functionality of the mobile device.

17. The method according claim 16, further comprising configuring one of the new cartoon images to be capable of storing an email address and initiating an email app on the mobile device upon selection.

18. A computer readable data medium storing computer-executable instructions that, when executed by a processor, cause the processor to:
receive a photographic image of a head shot of a person;
process the photographic image to identify landmarks and determine interrelationship between reference points on a face of the person in the heat shot image;
store a database of cartoon landmarks;
compare the landmarks of the photographic image to the database of cartoon landmarks and identify cartoon landmarks in the database that match or are the closest match;
assemble a cartoon head shot image of the person by assembling the matching cartoon landmarks based on the determined interrelationships;
store a plurality of algorithms that each corresponds to a defined emotion wherein the algorithm is configured to convert the cartoon head shot to express the defined emotion;
convert the cartoon head shot using the algorithm, wherein the conversion results in producing a plurality of new cartoon images that each contains cartoon head shot that expresses a corresponding emotion defined by the corresponding algorithm; and
transmit a digital keyboard containing a plurality of the new cartoon images expressing different emotions to a mobile device of the person.

19. The computer readable data medium according to claim 18, wherein the image processing step includes processing the photographic image in conjunction with a set of predefined landmarks to locate positions of the landmarks on the photographic image.

20. The computer readable data medium according to claim 18, further comprising instructions that, when executed by a processor, cause the processor to configure the new cartoon images to be capable of storing information and initiating a functionality of the mobile device.

* * * * *